(12) United States Patent
Wu

(10) Patent No.: US 8,240,925 B2
(45) Date of Patent: Aug. 14, 2012

(54) OPTICAL FIBER CONNECTOR

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 230 days.

(21) Appl. No.: 12/822,192

(22) Filed: Jun. 24, 2010

(65) Prior Publication Data

US 2011/0222820 A1 Sep. 15, 2011

(30) Foreign Application Priority Data

Mar. 9, 2010 (TW) ................................ 99106686 A

(51) Int. Cl.
*G02B 6/40* (2006.01)
*G02B 6/36* (2006.01)

(52) U.S. Cl. ............................................ 385/71; 385/88
(58) Field of Classification Search ........................ None
See application file for complete search history.

(56) References Cited

U.S. PATENT DOCUMENTS

2002/0197023 A1* 12/2002 Serizawa ......................... 385/88
2006/0067631 A1* 3/2006 Wang et al. .................... 385/92
* cited by examiner

*Primary Examiner* — Tina Wong
(74) *Attorney, Agent, or Firm* — Altis Law Group, Inc.

(57) ABSTRACT

An optical fiber connector includes a housing, a connector body, a plurality of optical fibers and spring portion. The housing includes a first sidewall and an opposite second sidewall. The connector body is received in the housing adjacent to the second sidewall. The optical fibers are attached to the connector body and extending through the first sidewall. The spring portion is received in the housing and resiliently compressed between the connector body and the first sidewall.

12 Claims, 3 Drawing Sheets

OPTICAL FIBER CONNECTOR

BACKGROUND

1. Technical Field

The present disclosure relates to connectors, and particularly, to an optical fiber connector.

2. Description of Related Art

An optical fiber connector is used to couple optical fibers. The optical fiber connector typically includes a housing and a connector body received in the housing. One end of the connector body is connected to a number of optical fibers; the other end of the connector body has a number of lenses positioned thereon, and each lens is aligned with a corresponding optical fiber. When in use, two optical fiber connectors are connected to each other to couple the optical signals between two optical fibers using the lenses. The connector bodies of the connectors are in contact with each other, and the optical signals can be transmitted from one optical fiber to another. The optical fiber connector further includes a resilient member (typically, a helical spring) employed to enhance contact and stabilize the connector body.

One end of the helical spring adjoins the inner surface of the housing while the other end adjoins an end of the connector body connecting to the optical fiber. However, when two optical fiber connectors are connected, if the force acting on the optical fiber connectors is asymmetrical, the connector body may be tilted relative to the corresponding housing.

What is needed therefore, is a optical fiber connector addressing the above-mentioned problems.

BRIEF DESCRIPTION OF THE DRAWINGS

The components of the drawings are not necessarily drawn to scale, the emphasis instead being placed upon clearly illustrating the principles of the embodiments of the optical fiber connector. Moreover, in the drawings, like reference numerals designate corresponding parts throughout several views.

DETAILED DESCRIPTION

Figure 1:
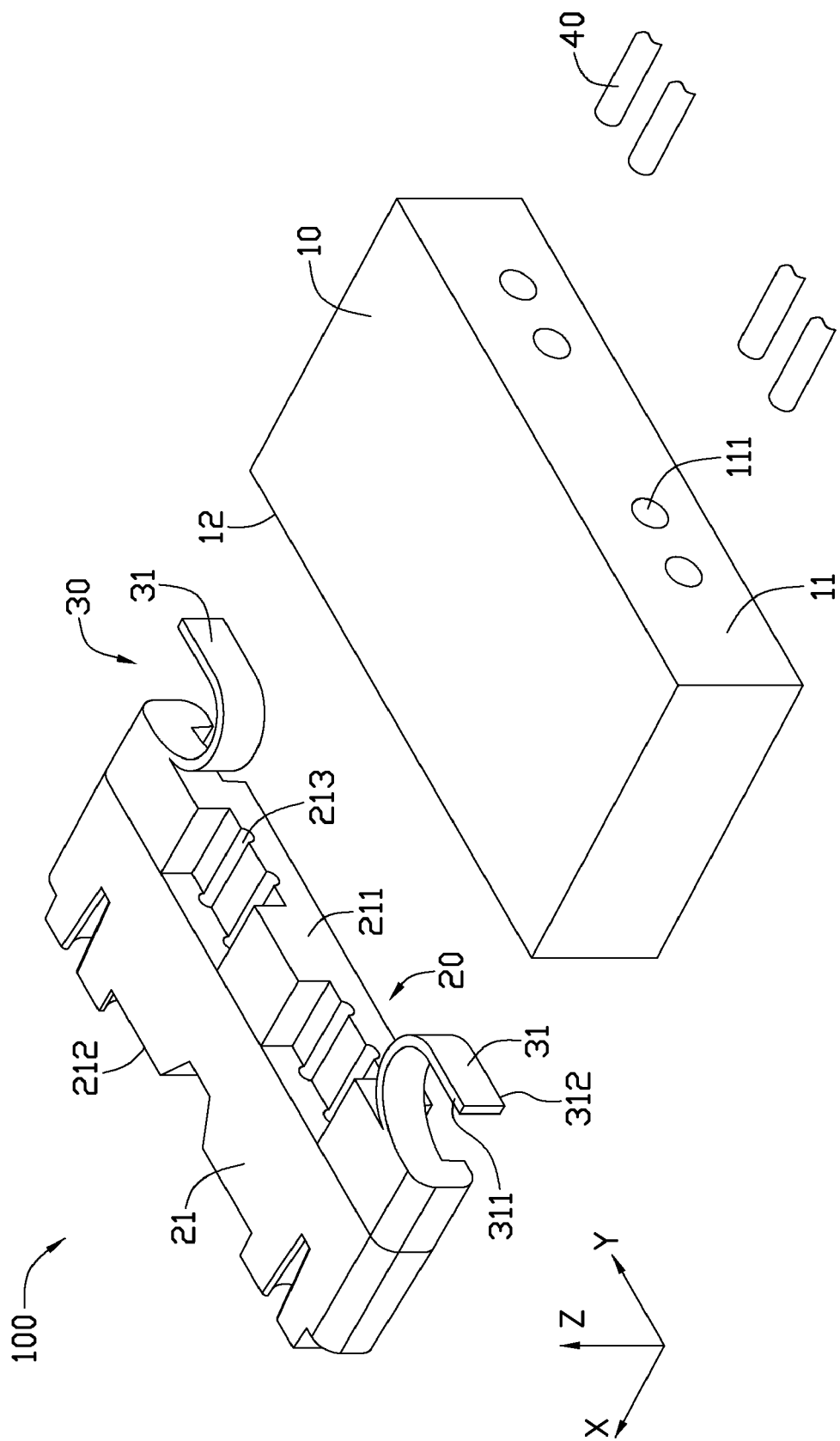
FIG. 1 is an exploded, isometric view of an optical fiber connector, according to an exemplary embodiment of the present disclosure.
Figure 2:
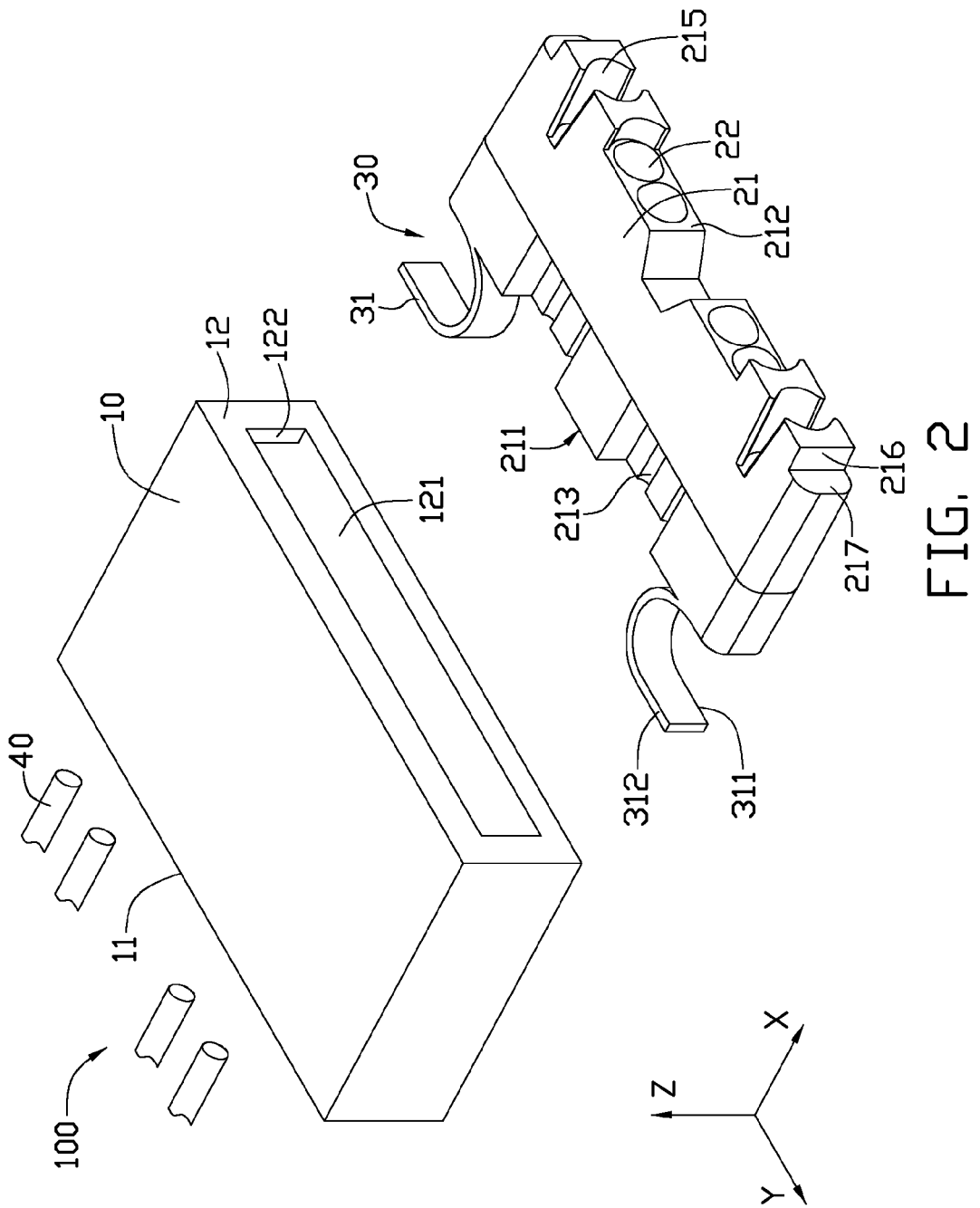
FIG. 2 is similar to FIG. 1, but showing the optical fiber connector viewed from a different angle.
Figure 3:
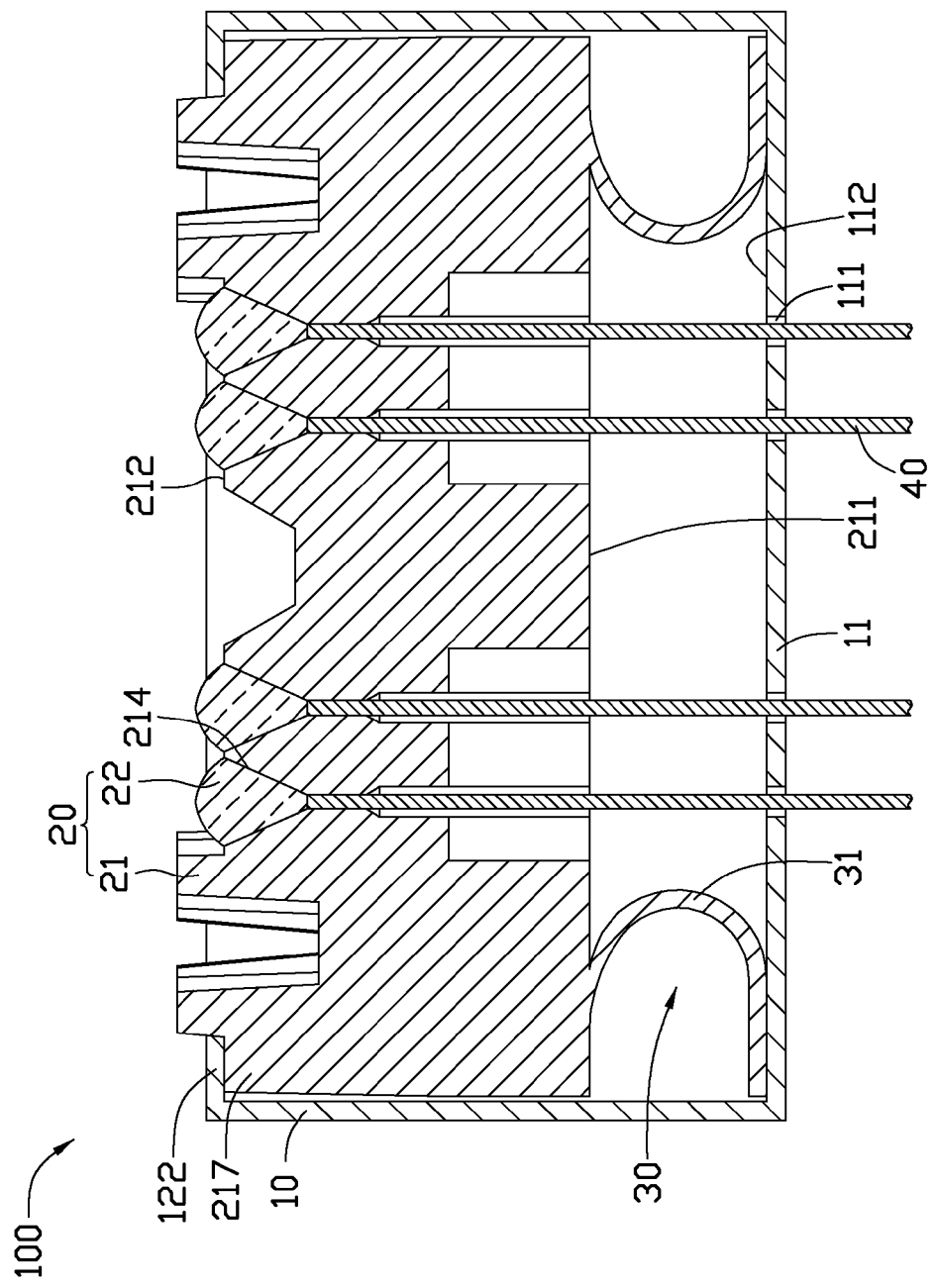
FIG. 3 is a sectional view of the assembled optical fiber connector of FIG. 1.

Referring to FIGS. 1-3, an optical fiber connector 100, according to an exemplary embodiment, is shown. The optical fiber connector 100 includes a housing 10, a connector body 20 and a resilient spring portion 30, and a plurality of optical fiber 40. The connector body 20 is partially received in the housing 10, the spring portion 30 is received in the housing 10, the optical fibers 40 are attached to the connector body 20 and extending out of the housing 10.

The housing 10 is substantially rectangular and hollow. The housing 10 includes a first sidewall 11 and a second sidewall 12 at opposite sides of the housing 10. The first sidewall 11 defines a number of through holes 111 for extending the optical fiber 40 therethrough. Each through hole 111 is configured to allow an optical fiber (not shown) to pass through. In this embodiment, the number of the through holes 111 is four. The second sidewall 12 defines an opening 121, the opening 121 is configured for allowing insertion of the connector body 20 into the housing 10. The housing 10 further includes two blocks 122 formed on opposite sides of the opening 121.

The connector body 20 includes a main portion 21 and a number of lenses 22 exposed at the second sidewall and optically coupled to the respective optical fibers 40. The main portion 21 includes a first end 211 and a second end 212 opposite to the first end 211. The first end 211 defines a number of fixing holes 213 corresponding to the through holes 111, and each fixing hole 213 is aligned with a corresponding through holes 111. Each of the fixing holes 213 is configured for receiving and fixing an end of an optical fiber therein. The second end 212 defines a number of receiving holes 214 corresponding to the fixing holes 213, and two engaging portions 215. Each receiving hole 214 corresponds to a fixing hole 213. The engaging portion 215 is configured for engaging with a matched optical fiber connector (not shown). The main portion 21 includes two side surfaces 216 substantially perpendicular to the surfaces of the second end 212 and the first end 211, and two engaging portions 217 each formed on a side surface 216. The engaging portions 217 correspond to the blocks 122. Each lens 22 is fixedly received in a corresponding fixing hole 212. The lens 22 transmits optical signals from one optical fiber to another optical fiber.

The spring portion 30 includes two resilient members 31 positioned between the inner surface of the first sidewall 11 and the surface of the first end 211. In this embodiment, the two resilient members 31 are on the surface of the first end 211, and each is adjacent to an edge of the first end 211. Each resilient member 31 is U-shaped, and one end of the resilient member 31 extends from or is connected to the surface of the first end 211. Each resilient member 31 includes a first edge 311 and a second edge 312 opposite to the first edge 311, the first edge 311 and the second edge 312 are spaced a distance form each other, thereby the resilient member 31 has a certain width. The open side of the U-shaped resilient member 31 comes in contact with the inner surface of the first sidewall 11. In this embodiment, the first and second edges 311, 312 of the resilient member 31 add additional alignment support to the lenses in the negative and positive z-axis. The two resilient member 31 connections and the two locations where the blocks 122 and engaging portions 217 add alignment support in the x/y-axes.

Alternatively, each resilient member 31 also can be a helix spring, and there may be more than two resilient members 31.

In assembly, each lens 22 is mounted in a corresponding receiving hole 214. One end of each optical fiber 40 is attached to the connector body 20 and optically couples to a corresponding optical lens 22, the other end of each optical fiber 40 is extends out of the housing through a corresponding through hole 111. The first end 211 of main portion 21 inserts into the housing 10, the second end 212 protrudes from the opening 121, and the two blocks 122 and the two engaging portions 217 employ resistance against each other to create a snap-fit connection between the housing 10 and the connector body 20. The free end of each resilient member 31 elastically contacts the inner surface of the first sidewall 11, and when the engaging portions 217 are resist the corresponding blocks 122, the resilient members 31 are constringed.

Because the two ends of the resilient member 31 are correspondingly pressed between the inner surface of the first sidewall 11 and the surface of the first end 211, the resilient members 31 can steadily support the main portion 21 of the connector body 20, the resilient members 31 can provide elastic force to drive the connector body 20 to the predetermined position preventing the connector body 20 tilting out of position.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector, comprising:
   a housing comprising a first sidewall and an opposite second sidewall;
   a connector body received in the housing adjacent to the second sidewall;
   a plurality of optical fibers attached to the connector body and extending through the first sidewall; and
   a spring portion received in the housing and resiliently compressed between the connector body and the first sidewall, the spring portion comprising two U shaped spring members.

2. The optical fiber connector of claim 1, wherein the second sidewall defines an opening for allowing insertion of the connector body into the housing.

3. The optical fiber connector of claim 2, wherein the connector body comprises a plurality of lenses exposed at the second sidewall and optically coupled to the respective optical fibers.

4. The optical fiber connector of claim 2, wherein the housing comprises two blocks formed on opposite sides of the opening, the connector body comprises two engaging portions corresponding to the two blocks, and the blocks and the engaging portions are configured to cooperatively create a snap-fit connection between the housing and the connector body.

5. The optical fiber connector of claim 1, wherein the first sidewall defines a plurality of through holes for extending the optical fibers therethrough.

6. The optical fiber connector of claim 1, wherein the spring members are integrally formed with the connector body.

7. An optical fiber connector, comprising:
   a housing comprising a first sidewall and an opposite second sidewall; and
   a connector body received in the housing adjacent to the second sidewall, the connector body comprising a plurality of lenses exposed at the second sidewall and optically coupled to the respective optical fibers;
   a plurality of optical fibers attached to the connector body and extending through the first sidewall; and
   two U shaped spring members received in the housing and resiliently compressed between the connector body and the first sidewall.

8. The optical fiber connector of claim 7, wherein the second sidewall defines an opening for allowing insertion of the connector body into enter the housing.

9. The optical fiber connector of claim 8, wherein the housing comprises two blocks formed on opposite sides of the opening, the connector body comprises two engaging portions corresponding to the two blocks, and the blocks and the engaging portions are configured to cooperatively create a snap-fit connection between the housing and the connector body.

10. The optical fiber connector of claim 7, wherein the first sidewall defines a plurality of through holes for extending the optical fiber therethrough.

11. The optical fiber connector of claim 7, wherein the resilient members are integrally formed with the connector body.

12. An optical fiber connector, comprising:
   a housing comprising a first sidewall, an opposite second sidewall and an opening defined in the second sidewall;
   a connector body received in the housing, the connector body having a portion extending beyond the second sidewall through the opening;
   a plurality of optical fibers attached to the connector body and extending through the first sidewall; and
   a spring portion received in the housing and resiliently compressed between the connector body and the first sidewall, the spring portion configured to apply a force upon the connector body in a direction from the first sidewall to the second sidewall, the spring portion comprising two U shaped spring members.

* * * * *